United States Patent
Iizuka et al.

(10) Patent No.: US 10,019,793 B2
(45) Date of Patent: Jul. 10, 2018

(54) TEST SYSTEM AND TEST METHOD

(71) Applicant: Toshiba Memory Corporation, Minato-ku (JP)

(72) Inventors: Kazuhiro Iizuka, Yokohama (JP); Kohei Noma, Setagaya (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 309 days.

(21) Appl. No.: 14/672,418

(22) Filed: Mar. 30, 2015

(65) Prior Publication Data

US 2015/0279015 A1    Oct. 1, 2015

(30) Foreign Application Priority Data

Mar. 31, 2014    (JP) .................................. 2014-074500

(51) Int. Cl.
*G06T 7/00* (2017.01)
*H04N 7/18* (2006.01)

(52) U.S. Cl.
CPC ............. *G06T 7/001* (2013.01); *H04N 7/183* (2013.01); *G06T 2207/10016* (2013.01)

(58) Field of Classification Search
CPC .......... G06T 7/001; G06T 2207/10016; G01N 19/04; H04N 7/183
USPC ......................................................... 348/86
See application file for complete search history.

(56) References Cited

U.S. PATENT DOCUMENTS

| | | | | |
|---|---|---|---|---|
| 4,400,231 A | * | 8/1983 | Martin ............... | B65H 35/0033 156/527 |
| 2010/0119332 A1 | * | 5/2010 | Ozawa ....................... | B41J 3/44 412/1 |
| 2013/0022756 A1 | * | 1/2013 | Augustine ............... | C23C 14/02 427/551 |
| 2013/0076572 A1 | * | 3/2013 | Lee .......................... | C09D 5/24 343/700 MS |
| 2013/0089970 A1 | * | 4/2013 | Amada ............. | H01L 21/67132 438/465 |
| 2016/0114565 A1 | * | 4/2016 | Qian ..................... | B32B 37/003 428/138 |

FOREIGN PATENT DOCUMENTS

JP    5-104833    4/1993

* cited by examiner

*Primary Examiner* — Jamie Atala
*Assistant Examiner* — Ayman Abaza
(74) *Attorney, Agent, or Firm* — Oblon, McClelland, Maier & Neustadt, L.L.P.

(57) ABSTRACT

According to an embodiment, A test system includes: a moving unit configured to move a test object, the test object including a first surface, a mark being printed on the first surface; a first imaging device configured to photograph the first surface of test object to obtain a first image; a cutter configured to scratch the first surface; a first unit configured to attach a tape to the first surface; a second unit configured to detach the tape from the first surface; a second imaging device configured to photograph the first surface after detaching the tape to obtain a second image; and a controller configured to compare the first image and the second image to output a comparison result.

6 Claims, 6 Drawing Sheets

STEP1

FIG. 5

STEP2

STEP4

FIG. 9

STEP6

FIG. 10

TEST SYSTEM AND TEST METHOD

CROSS-REFERENCE TO RELATED APPLICATION

This application is based upon and claims the benefit of priority from Japanese Patent Application No. 2014-074500, filed Mar. 31, 2014; the entire contents of which are incorporated herein by reference.

FIELD

Embodiments described herein relate generally to a test system and a test method.

BACKGROUND

In general, a logotype for showing indication of source or the like is provided on a product. When the logotype or the like is simply detached from the product, a source of the product cannot be known. For this reason, a product, in which a degree of adhesion between the product and the logotype or the like is equal to or higher than regulations, is supposed to be shipped. In order to measure the degree of adhesion, an adhesion test is performed.

DESCRIPTION OF THE DRAWINGS

FIGS. 1A and 1B illustrate an example of a test system according to a first embodiment. FIG. 1A is a schematic view which is viewed from a horizontal direction. FIG. 1B is a schematic view which is viewed from above.

DETAILED DESCRIPTION

Following embodiments are to provide a test system which may improve accuracy of an adhesion test and an adhesion test method.

In general, according to one embodiment, a test system includes: a moving unit configured to move a test object, the test object including a first surface, a mark being printed on the first surface; a first imaging device configured to photograph the first surface of test object to obtain a first image; a cutter configured to scratch the first surface; a first unit configured to attach a tape to the first surface; a second unit configured to detach the tape from the first surface; a second imaging device configured to photograph the first surface after detaching the tape to obtain a second image; and a controller configured to compare the first image and the second image to output a comparison result.

Hereinafter, each embodiment will be described with reference to the drawings. In the accompanying drawings, the same portions are denoted by the same reference numerals and signs. In addition, the repeated description thereof will given as necessary.

(First Embodiment)

A first embodiment will be described with reference to FIG. 1A and FIG. 1B.

<Object which will be Tested in Test System>

A test object 1 is a memory card or a USB memory for example . The test object 1 includes a first surface 1a and a second surface 1b which is opposite to the first surface 1a. Hereinafter, a memory card 1 will be described as an example.

Figure 1A:
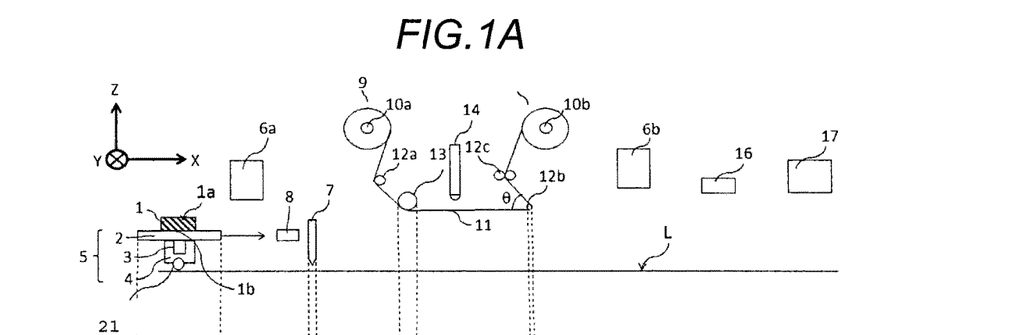
Figure 1B:
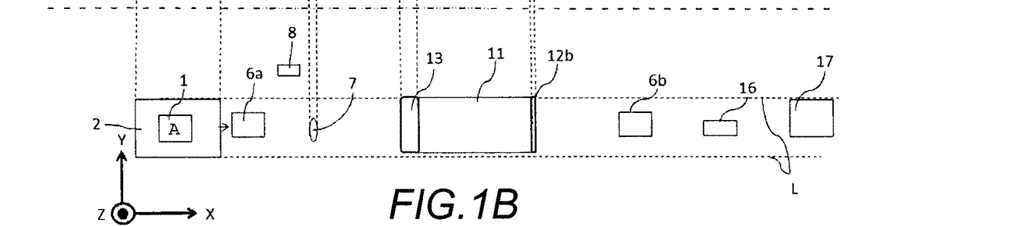

As shown in FIG. 1B, a character "A" is printed on the first surface 1a of the memory card 1 as a mark. The mark in the following description is not limited to the character. A logotype or a picture may be provided on the test object 1 instead of the character.

The test system according to the embodiment performs an adhesion test with respect to the character "A". In addition, a method of forming the mark may be any method if the mark is provided on the test object 1, not limiting to means of spraying, painting, printing, or the like.

<Test System>

As shown in FIG. 1A and FIG. 1B, the test system according to the embodiment includes a moving unit 5, a first imaging device 6a, a second imaging device 6b, a cutter 7, a sensor 8, a first roller 9, an adhesive tape 11, a guide rollers 12a, 12b, and 12c, a platen roller 13, a first member 14, a second roller 15, a printing recognition unit 16, a display 17, a calculation device 18, a control device 19, and a memory device 20.

The moving unit 5 includes a platform 2, an absorption device 3, and a driving device 4. The platform 2 includes a first surface and a second surface. The memory card 1 may be mounted on the first surface of the platform 2.

The platform 2 has a recess portion in the first surface of the platform 2. The recess portion has a function of fixing the memory card 1. The control device 19 adjusts the recess portion according to an area of the memory card 1 . In addition, the platform 2 has a hole which passes from the first surface to the second surface. On the second surface of the platform 2, the absorption device 3 and the driving device 4 are provided. The absorption device 3 may operate during the adhesion test. The absorption device 3 is provided below the hole.

The absorption device 3 may keep the memory card 1 fixed to the platform 2 during the adhesion test. The control device 19 is configures to control the platform 2, the absorption device 3, the driving device 4, the first imaging device 6a, the second imaging device 6b, the cutter 7, the sensor 8, the first roller 9, the adhesive tape 11, the guide rollers 12a, 12b, and 12c, the platen roller 13, the first member 14, the second roller 15, the printing recognition unit 16, the display 17, the calculation device 18, the control device 19, and the memory device 20. When the control device 19 outputs an operation command to the absorption device 3, the absorption device 3 adsorbs the memory card 1 via the hole from the first surface to the second surface of the platform 2. As a result, the memory card 1 is fixed to the platform 2.

The driving device 4 includes, for example, a motor, and moves the moving unit 5 to each test area.

A wheel 21 is provided on the moving unit 5. The wheel 21 may carry moving unit 5 to each test area. In order to move the moving unit 5 to each test area, for example, a rail L is provided, and the wheel 21 rotates on the rail L.

The first imaging device 6a has a function of confirming at which position among an X direction and a Y direction the memory card 1 is located with respect to the platform 2. The X direction is a direction in which the moving unit 5 moves forward. The Y direction is a direction which is orthogonal to the X direction with respect to FIG. 1A. A Z direction is a direction which is perpendicular to the X direction and the Y direction.

The cutter 7 includes a blade portion. When the control device 19 sends a first command to the cutter 7, the cutter 7 scratches the mark (the character "A" in FIG. 1A) which is printed on the first surface 1a of the memory card 1 by using the blade portion. The cutter 7 is not limited to this case, and may include a plurality of blade portions. The blade portions are configured with 6 blades at an interval of 1 mm or 2 mm, for example. In addition, it is possible to change the blades according to the size of the area of the memory card 1. When the cutter 7 scratches the mark of the memory card 1, according to a location where the memory card 1 is positioned, it is possible to change the position of the cutter 7. The control device 19 is configured to control the position of the cutter 7.

The sensor device 8 is, for example, a laser sensor. The sensor device 8 always outputs a laser toward an area which the moving unit 5 passes. When the memory card 1 reaches a predetermined position, the laser is blocked, and the sensor device 8 detects that the memory card 1 reaches the predetermined position. The sensor device 8 notifies the control device 19 that the moving unit 5 reaches the predetermined position. In addition, the sensor device 8 may be a position sensor or the like.

The first roller 9 is fixed to a driving shaft 10a, and the driving shaft 10a is connected to a rotation shaft (not illustration) of the motor or the like. The adhesive tape 11 is attached to the driving shaft 10a. When the control device 19 sends a second command to the motor, the driving shaft 10a rotates. As the driving shaft 10a rotates, the first roller 9 rotates. According to the rotation of the first roller 9, the adhesive tape 11 is sent out.

The second roller 15 has a driving shaft 10b. The second roller 15 retrieves the adhesive tape 11 which is detached from the first surface 1a.

The driving shaft 10b of the second roller 15 is fixed. The driving shaft 10b is connected to the rotation shaft of the motor or the like. When the control device 19 sends a third command to the motor connected to the second roller 15, the driving shaft 10b rotates. As a result of this, the second roller 15 rotates and retrieves the adhesive tape 11 which is detached from the first surface 1a. When the adhesive tape 11 is adhered to the memory card 1, the driving device 4 or the like is controlled by the control device 19 so that the moving speed of the adhesive tape 11 is the same as the moving speed of the memory card 1.

The adhesive tape 11 is a tape RCT-18° or an LP-1811 which are defined by a JIS standard, for example. The surface of the adhesive tape 11 which is attached to the memory card 1 may cover the entire surface of the memory card 1.

The guide rollers 12a, 12b, and 12c have a function of maintaining a tension of the adhesive tape 11. In a state where the adhesive tape 11 is loosened, it is not possible to uniformly attach the adhesive tape 11 to the first surface 1a. For this reason, when the adhesive tape 11 is attached to the first surface 1a, it is required that the adhesive tape 11 be in a state of being pulled. In this state, as the platen roller 13 (to be described hereinafter) rolls on the memory card 1, the adhesive tape 11 is uniformly attached to the memory card 1. In addition, when the adhesive tape 11 is detached from the first surface 1a, in a state where the adhesive tape 11 is loosened, it is not possible to uniformly detach the adhesive tape 11. Here, the control device 19 adjusts the guide rollers 1a, 12b, and 12c to be at an angle which maintains the tension of the adhesive tape 11. The control device 19 may adjust the guide rollers 12a, 12b, and 12c to be at an angle which detaches the adhesive tape 11 that is determined by a standard of the adhesion test.

The platen roller 13 is a roll-shaped machine. The platen roller 13 rotates on the memory card 1 via the adhesive tape 11, and attaches the adhesive tape 11 to the memory card 1. The platen roller 13 moves in the Z direction based on a fourth command input from the control device 19. Accordingly, even when the memory card 1 has a certain thickness, the adhesive tape 11 may be uniformly attached to the entire surface of the memory card 1.

The first member 14 includes a part which has a curvature at an end part thereof. For example, the first member 14 may be in the same shape as a ladle, a spatula, or a spoon. The adhesive tape 11 is attached to the memory card 1 as the platen roller 13 rotates the first surface 1a via the adhesive tape 11. If the first surface 1a is rough, or the like, there is a case where the adhesive tape 11 is not attach to the memory card 1 sufficiently. The first member 14 may reciprocatively move so that the adhesive tape 11 and the memory card 1 are uniformly attached to each other while pushing the first surface 1a via the adhesive tape 11. In a case of a robot arm or the like, for example, the first member 14 may arbitrarily operate on the memory card 1 via the adhesive tape 11, by an embedded program. Accordingly, it is possible to improve uniformity of adhesion between the adhesive tape 11 and the first surface 1a of the memory card 1.

Figure 2:
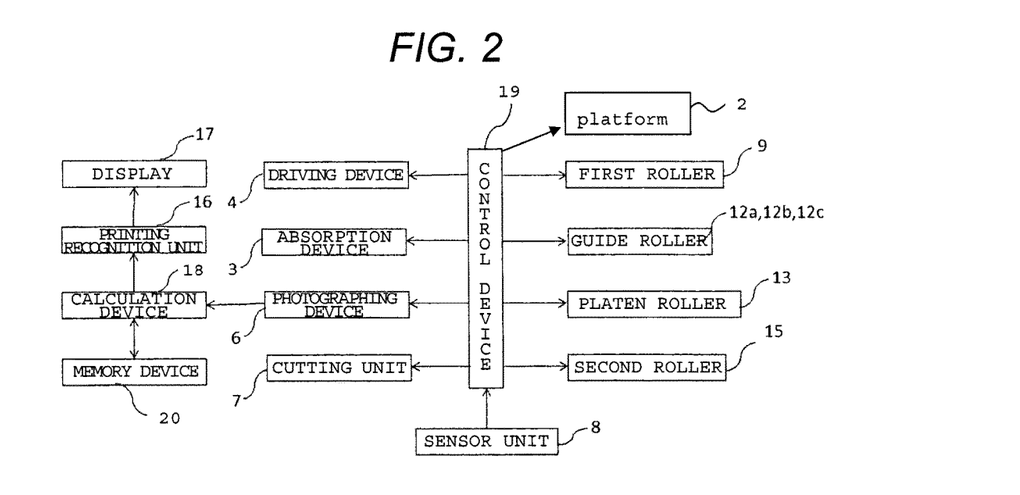
FIG. 2 is a block diagram of the test system according to the first embodiment.

The calculation device 18 has a digital conversion function with respect to a photographed image.

The memory device 20 is, for example, a flash memory or a hard disc. The memory device 19 has a function of storing digital-converted data.

<Operation Flow of Test System>

Figure 3:
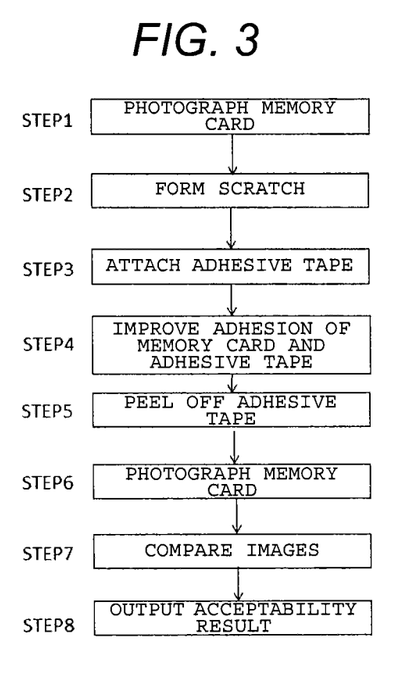
FIG. 3 is a flow chart illustrating an operation of the test system according to the first embodiment.

Next, an operation of the test system will be illustrated in FIG. 3. FIGS. 4 to 9 are flow charts illustrating each process of a test method.

<<STEP 1 Photograph Memory Card 1>>

Figure 4:
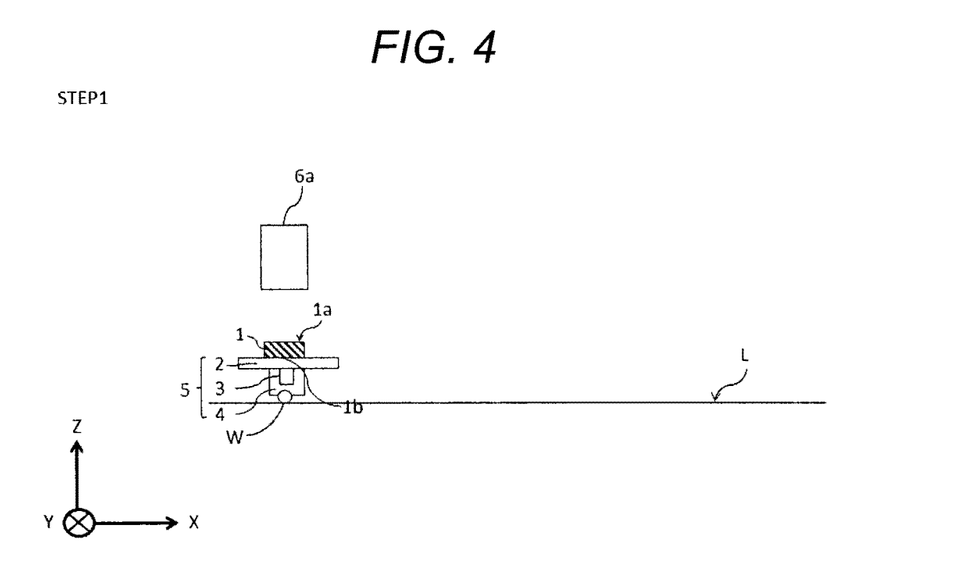
FIG. 4 is a schematic side surface view of each device illustrating each process in the test system according to the first embodiment.

As illustrated in FIG. 4, first, the control device 19 outputs a command for starting operation to the absorption device 3. The absorption device 3 starts absorbing the memory card 1, and fixes the memory card 1 to the platform 2. In this state, the control device 19 outputs a command for operating to the first imaging device 6a, and the first imaging device 6a photographs the first surface 1a of the memory card 1. The calculation device 18 converts the photographed image into data and transfers the data to the memory device 20. The memory device 20 stores the data.

When the control device 19 outputs a command for operating to the moving unit 5, the moving unit 5 starts transporting the memory card 1 in the X direction.

When the moving unit 5 reaches the predetermined position which is detected by the sensor device 8, the laser is blocked, and the sensor 8 notifies the control device 19 that the memory card 1 reaches the predetermined position. The control device 19 sends a command for stopping to the moving unit 5, and stops the moving unit 5.

<<STEP 2 Form Scratch On Memory Card 1>>

Figure 5:
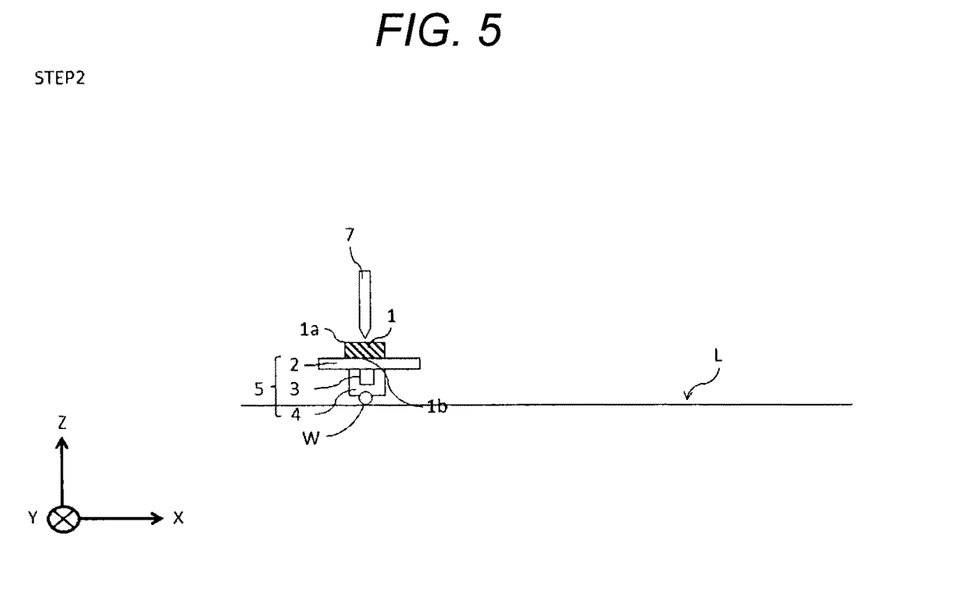
FIG. 5 is a schematic side surface view of each device illustrating each process in the test system according to the first embodiment.

As illustrated in FIG. 5, the control device 19 outputs a command for operating to the cutter 7, and the cutter 7 scratches the mark (character "A" in FIG. 5) in a longitudinal direction and in a direction which is orthogonal to the longitudinal direction, according to the standard of the adhesion test. Even when the memory card 1 is positioned to be shifted from a desired position in the platform 2, the cutter 7 scratches the memory card 1 after the cutter 7 is shifted to the position which is above the memory card 1. It may be unnecessary to shift a position of the cutter 7 because it is enough for the cutter 7 to scratch at least one part of the mark.

The control device 19 outputs a command for stopping to the cutter 7, and then stops scratching the character "A" of the first surface 1*a*. After that, the cutter 7 returns to a position of beginning.

<<STEP 3 Attach Adhesive Tape>>

Figure 6:
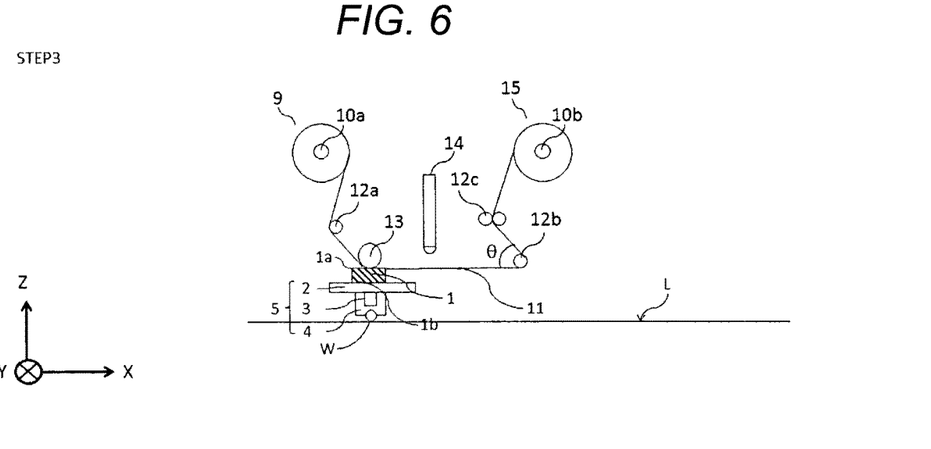
FIG. 6 is a schematic side surface view of each device illustrating each process in the test system according to the first embodiment.

As illustrated in FIG. 6, the control device 19 outputs a command for operating to the motor of the driving axes 10*a* and 10*b* of the first roller 9. The driving shaft 10*a* and the driving shaft 10*b* rotate, and the first roller 9 and the second roller 15 rotate. And then the adhesive tape 11 is sent out from the first roller 9.

The control device 19 outputs a command for operating to a guide roller 12 and the platen roller 13. Accordingly, the guide rollers 12*a*, 12*b*, and 12*c* move so as to maintain the tension of the adhesive tape 11.

While the adhesive tape 11 maintains the tension by the guide roller 12*a*, the adhesive tape 11 reaches the platen roller 13. The platen roller 13 rotates on the first surface 1*a* via the adhesive tape 11. The adhesive tape 11 is attached to the first surface 1*a* of the memory card 1. The platen roller 13 moves in the Z direction. Accordingly, it is possible to react even to the memory card which has a certain extent of thickness.

<<STEP 4 Adhesion of Memory Card and Adhesive Tape>>

Figure 7:
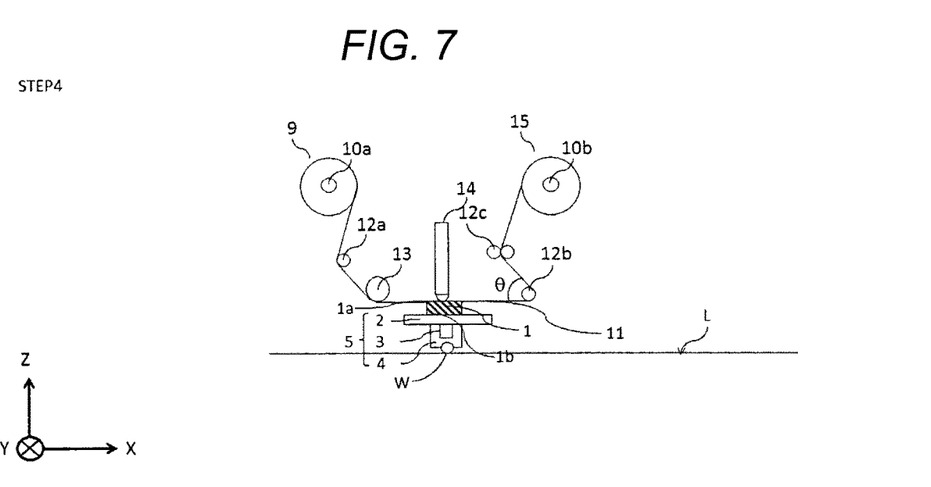
FIG. 7 is a schematic side surface view of each device illustrating each process in the test system according to the first embodiment.
Figure 8:
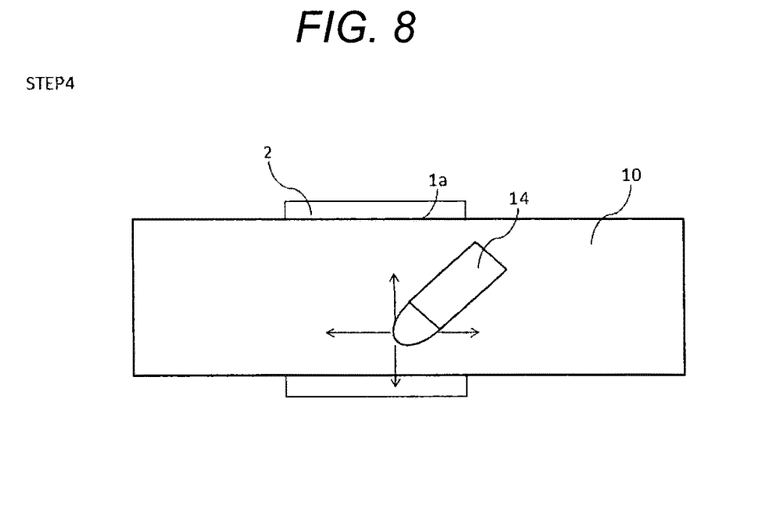
FIG. 8 is a schematic plan view illustrating a relationship between a first member and a first surface in the test system according to the first embodiment.

As illustrated in FIGS. 7 and 8, the control device 19 outputs a command for operating to the first member 14, and lower the first member 14 until contacting with the first surface 1*a* via the adhesive tape 11. FIG. 8 is a plan view illustrating an operation of the first member. In order to uniformly attach the adhesive tape 11 to the memory card 1, while pushing the first surface 1*a* via the adhesive tape 11, the first member 14 reciprocatively moves the entire surface of the memory card 1 in the X direction and the Y direction, in a uniform manner. As a result of this, even when the first surface 1*a* is rough, it is possible to improve adhesion between the adhesive tape 11 and the first surface 1*a*.

<<STEP 5 Detach Adhesive Tape>>

After step 4, the control device 19 outputs a command for stopping to the first member 14, and stops the movement of the first member 14. The guide roller 12*c* adjusts an angle θ at which the adhesive tape 11 is detached from the first surface 1*a*. In the adhesion test, the angle θ is defined as 60 degrees for example. The angle θ is not limited to 60 degrees. The control device 19 outputs a command for operating to the guide roller 12*c* so that an angle θ is 60 degrees.

In this manner, by the guide roller 12*b* and the guide roller 12*c*, it is possible to detach the adhesive tape 11 by adjusting the angle at which the adhesive tape 11 is detached from the memory card 1 within the standard. After this, in the adhesive tape 11, the driving shaft 10*b* rotates and the second roller 15 retrieves the adhesive tape 11.

<<STEP 6 Photograph Memory Card>>

Figure 9:
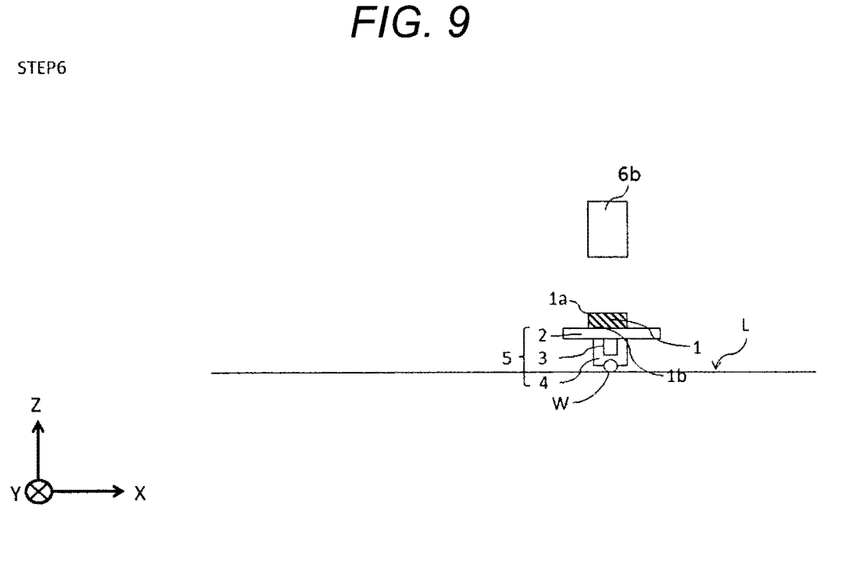
FIG. 9 is a schematic side surface view of each device illustrating each process in the test system according to the first embodiment.

When the moving unit 5 reaches the predetermined position, the control device 19 outputs a command for stopping to the moving unit 5, and then stops the moving unit 5.

As illustrated in FIG. 9, the control device 19 outputs a command for photographing to the second imaging device 6*b*, and the second imaging device 6*b* photographs the mark (character "A") of the first surface 1*a* on which the adhesive tape 11 is attached and detached. In this embodiment, the first imaging device 6*a* is different from the second imaging device 6*b*. However the first imaging device 6*a* may be the same as the second imaging device 6*b*both imaging devices 6*a*, 6*b* may have the same function.

The calculation device 18 converts the photographed image into the data, and transfers the data to the memory device 20. The memory device 20 stores the data.

<<STEP 7 Compare Images>>

The printing recognition unit 16 performs an image processing step for the photographed image which is stored in the memory device 20. In this step 7, the printing recognition unit 16 extracts a first image from the image photographed in step 1. The first image is a part of the mark (the character "A") before the test. The printing recognition unit 16 also extracts a second image from the image photographed in step 6. The second image is a part of the mark after the test.

After this, the printing recognition unit 16 compares the first image with the second image, and calculates a comparison result. For example, the printing recognition unit 16 calculates what percentage of mark in the second image remains compared to the first image.

<<STEP 8 Output Acceptability Result>>

After calculating the comparison result, if the percentage exceeds a first percentage, the printing recognition unit 16 judges that a result of this test is "pass". On the other hand, if the percentage does not exceed a first percentage, the printing recognition unit 16 judges that a result of this test is "fail". The printing recognition unit 16 transfers results of "pass" or "fail" to the display 17. And then the display 17 shows the result of "pass" or "fail".

Hereinafter, by using the test system, in forming the scratch on the memory card 1, it is possible to scratch the memory card 1 according to the standard. Since the cutter 7 automatically scratches the first surface of the memory card 1, for example, even when the memory card 1 is positioned to be shifted from the platform 2, it is possible to scratch the first surface of the memory card 1 according to the standard. In addition, in order to react to a small memory card which causes a difficulty of scratching by a manual operation, the adhesion test is performed with higher accuracy.

The angle at which the adhesive tape 11 is detached from the memory card 1 is determined to be 60 degrees by the standard of the adhesion test. For this reason, as the control device 19 adjusts the position of the guide roller to be a position where the angle θ is 60 degrees, it is possible to detach the adhesive tape 11 by unifying the angle at which the adhesive tape 11 is detached within the standard.

In the systems according to the embodiment, it is possible to scratch the mark under the same condition, to attach the adhesive tape 11, and to detach the adhesive tape 11 under the same condition. Therefore it is possible to perform comparison between the first image before scratching the mark and the second image after detaching the adhesive tape 11. Accordingly, by automating the process which is manually performed conventionally, it is possible to reduce a human influence, such as a power adjustment caused by the manual operation and a capacity according to experience level of an operator. In addition, since it is possible to perform the adhesion test with higher accuracy as the human influence is reduced, reliability of the test is improved. Furthermore, since it is possible to perform the operation with a more constant speed by the test system, it is possible to expect an effect of improving operation efficiency.

(Second Embodiment)

A second embodiment is described.

Figure 10:
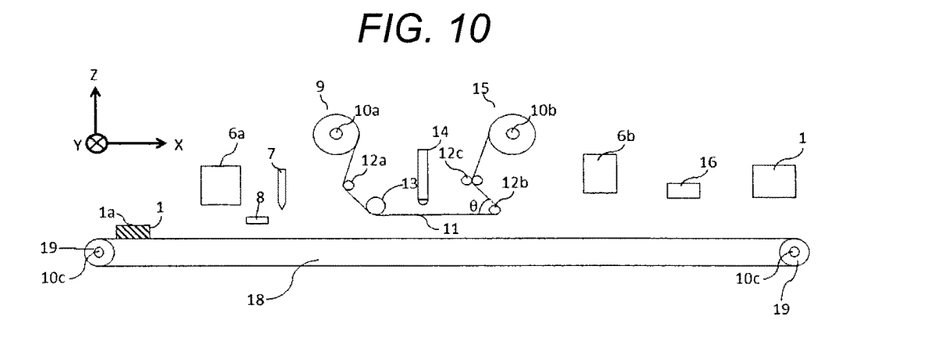
FIG. 10 is a schematic view illustrating a modification example of the first embodiment when the test system is viewed from the horizontal direction.

The second embodiment is different from the first embodiment in that the moving unit 5 is a transporting path 18. The second embodiment will be described with reference to FIG. 10. FIG. 10 is a schematic side surface view of each device illustrating each process in a test system according to the second embodiment.

<STEP 1>

As illustrated in FIG. 10, The Test System of the second embodiment has the transporting path 18, a driving shaft 10c, a moving mechanism surface, and a roller member 19. The transporting path 18 is, for example, a belt conveyer. The moving mechanism surface is linked via the roller member. The roller member 19 is fixed to the driving shaft 10c, and the driving shaft 10c is connected to the rotation shaft of the motor or the like. When the control device 19 sends a command for operating to the motor, the driving shaft 10c rotates. As the driving shaft 10c rotates, the roller member 19 rotates and the transporting path 18 moves. As length of the transporting path 18 extends in the Y direction, it is possible to transport many memory cards 1 by mounting the memory cards 1 onto the transporting path 18.

The platen roller 13 may extend in the Y direction, or may freely operate in an XY direction, like a robot arm.

Above, in the process of the adhesion test, it is possible to prevent irregularity. In addition, as the transporting path 18 extends in the Y direction, it is possible to expect an effect of further improving the operation efficiency since the number of tests of the memory card 1 increases.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A test system, comprising:
    a conveyor belt driving device configured to move a test object, the test object including a first surface, a mark being printed on the first surface;
    a first imaging device configured to photograph the first surface of the test object to obtain a first image;
    a cutter configured to scratch the first surface;
    a platen roller configured to attach a tape to the first surface;
    a first member including an end part having a curvature, the end part being configured to reciprocatively move in a first and second direction on the test object via attached the tape and press the attached tape onto the test object, the first direction being perpendicular to the second direction;
    a guide roller configured to detach the attached tape from the first surface, wherein the attached tape is detached by a combination of a movement of the guide roller and a movement of the conveyor belt;
    a second imaging device configured to photograph the first surface after detaching the tape to obtain a second image; and
    a controller configured to compare the first image and the second image to output a comparison result.

2. The system according to claim 1,
    wherein the cutter includes a blade, and the cutter adjusts a position of the blade according to a position of the test object.

3. The system according to claim 1, wherein
    the driving device moves in the first direction, and
    a width of the platen roller in the second direction is larger than a width of the test object in the second direction.

4. The system according to claim 1, wherein
    the driving device moves in the first direction, and
    a width of the first member in the second direction is smaller than a width of the test object in the second direction.

5. The system according to claim 1, wherein a width of the first member in the second direction is smaller than a width of the test object in the second direction.

6. The system according to claim 1, wherein a moving speed of the attached tape is the same as a moving speed of the test object.

\* \* \* \* \*